K. E. SOLBERG.
CALIPERING RULE.
APPLICATION FILED SEPT. 26, 1918.

1,341,865. Patented June 1, 1920.

Witnesses:-
William H. Pinoir
Gertrude Bader

Inventor:-
Knut Elving Solberg
by his Attorney

UNITED STATES PATENT OFFICE.

KNUT ELVING SOLBERG, OF PHILADELPHIA, PENNSYLVANIA.

CALIPERING-RULE.

1,341,865.  Specification of Letters Patent.  Patented June 1, 1920.

Application filed September 26, 1918. Serial No. 255,758.

*To all whom it may concern:*

Be it known that I, KNUT ELVING SOLBERG, a subject of the King of Sweden, residing at 2331 St. Alban's Place, Philadelphia, in the county of Philadelphia and State of Pennsylvania, have invented a certain new and useful Calipering-Rule, of which the following is a specification.

My invention relates to caliper jaws intended for attachment to a rule so as to form beam calipers, using the rule as the beam and making the scale of the rule available for direct reading of the distance between the jaws.

The purpose of my invention is to protect the edges of the rule by a guide for the caliper jaws which is held in place by one of the jaws.

A further purpose is to spring the guides for the jaws into position so as to engage the rule edge throughout an extended rule length.

A further purpose is to form the jaws of sheet material.

Further purposes relate to the manner of securing the jaws to the guides.

I have preferred to illustrate my invention by but one form thereof, selecting a form which has proved to be practical, and highly efficient in use and which at the same time well illustrates the principles of my invention.

Figure 1:
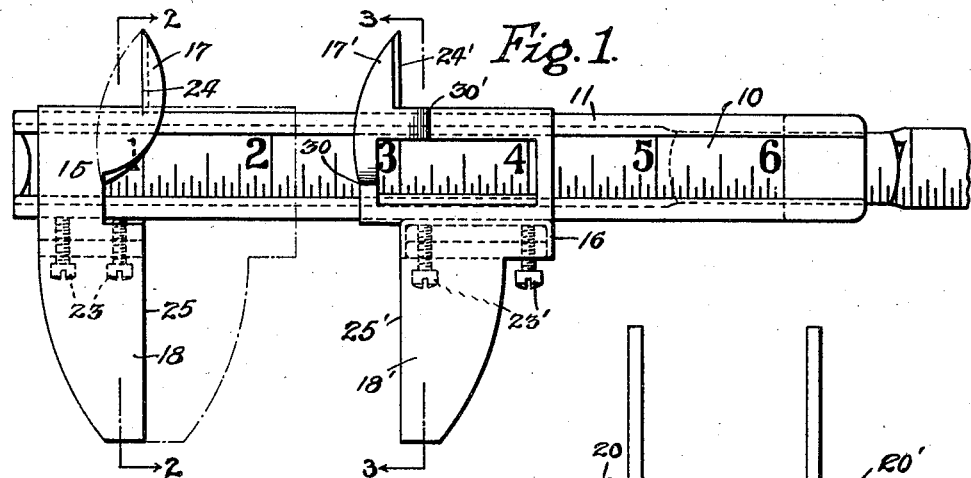

Figure 1 is a side elevation of the preferred form of my invention.

Figures 2, 3:
Figure 4:
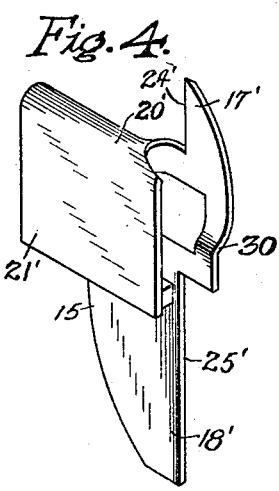
Figure 5:
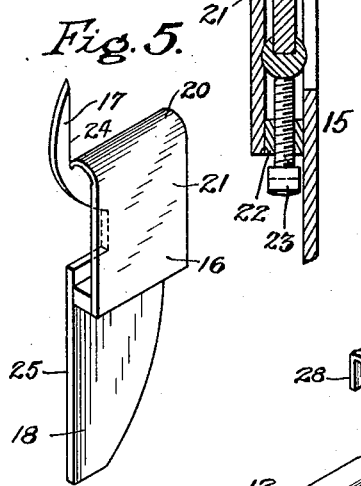
Figure 6:
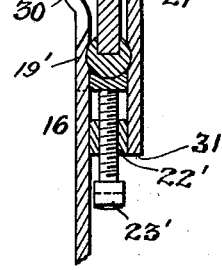
Figure 7:
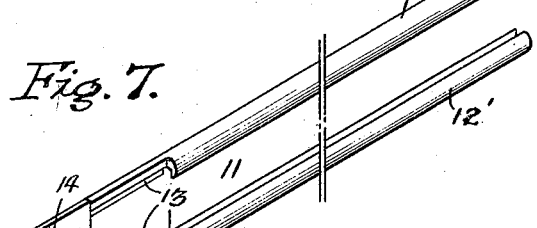

Figs. 2 and 3 are sections taken upon lines 2—2 and 3—3 respectively of Fig. 1, looking in the directions of the arrows.

Figs. 4 to 7 are perspective views of various parts of the mechanism.

In the drawings similar numerals indicate corresponding parts.

The rule 10 is intended to be conventionally illustrated and may be one section of a folding rule as shown, or independent and complete, as preferred. In order to protect its edges, I provide a combined guide and edge protector 11, comprising longitudinally extending guide strips 12 and 12', grooved at 13 to fit the edges of the rule and united at one end by a connecting piece 14. This is laterally displaced to allow room for the rule in line with the grooves.

The guards or guides 12, 12' are preferably slightly divergent and of spring material, so proportioned that when sprung together over the rule edges, their outside surfaces will be parallel at the same time that the inner surfaces of the grooves grip the edge of the rule firmly for a considerable rule length.

The guide 11 is placed upon the rule with the open end toward the end of the rule as shown and is held in place by the fastening mechanism of a fixed caliper jaw 15, which coöperates with the movable caliper jaw 16. The jaws 15 and 16 are provided with coöperating male and female calipering arms, 17, 17' and 18, 18' and are formed preferably of strip material bent to form the jaws, providing front faces 19, 19' and bent at 20, 20' to encircle one of the guides as 12, extending therebeyond to form rear faces 21, 21'. The front and rear faces are separated at the edges opposite the bends by blocks 22, 22' which may be brazed in position.

The blocks 22, 22' unite and brace the parts at the same time that they space them and give bearing for screws 23, 23' by which the jaws are clamped in position.

Because of the fixed character of the jaw 15, its screws 23 may be conveniently rested directly against the guide in suitable position for the edges 24, 25 of the arms 17 and 18 to register with a selected marking on the rule.

At the same time that these screws hold the jaw 15 in adjusted position so as to register the edges 24, 25 fixedly with one of the graduations of the scale, they hold the guides rigidly upon the rule to prevent displacement with respect to the rule by reason of guide movement and obtain and maintain parallelism of the outer surfaces of the two guides.

Because smooth and even movement of the movable caliper jaw requires the maintenance of a smooth guide surface, it is undesirable to have the screws 23' bear directly upon the guide. I therefore provide a shoe 26 having a curved edge 27 to fit between the screws and the guide. To avoid accidental displacement, this shoe is transversely extended at the ends at 28, 28'. It is also slightly curved to avoid digging into the guide material, as best seen at 29.

In order that the male calipering arm 17' may pass the arm 17 to permit small measurements to be made, this arm 17' is offset, as at 30, 30' and both of the jaws are slightly open on their front faces, so that the registration of the edges 24 and 25 of the one and 24', 25' of the other with rule graduations may be observed.

The reason for preferring to use the blocks 22, 22' instead of the very simple expedient of turning down the edge 31 of the rear side to act as the spacer and block, is merely the preference for a more extended screw bearing offered by the block and changes in this construction, as in other features of the invention, may obviously be made, without departing from the scope of the claims.

Having thus described my invention, what I claim as new and desire to secure by Letters Patent is:

1. In a rule caliper, a subcombination comprising a pair of guides adapted to engage the edges of a rule and connected at one end, a rule adapted to project past the guides at either end and calipering jaws upon the guide spaced longitudinally of the rule.

2. In a rule caliper, a subcombination comprising a pair of guides adapted to engage the edges of a rule connected at one end and normally diverging at the other, a rule having its main portion projecting past the guides at their connected end and means for pressing the diverging ends against the rule.

3. In a rule caliper, a pair of guides adapted to engage the edges of a rule, connected at one end and free to move toward and from each other at the other end and clamping means for gripping the outside of the guides and for holding them at the free ends against the rule and movable upon the guides.

4. In a rule caliper, a pair of guides adapted to be clamped upon the edges of a rule in combination with a pair of jaws both removable from the rule, one adapted to be fixed upon the guides and the other adapted to move along them.

5. In a rule caliper, guides adapted to engage the edges of the rule in combination with calipering jaws adapted to fit upon the guides and hold them in position.

6. In a rule caliper, a pair of guides connected at one end and adapted to engage the edges of the rule, in combination with a pair of calipering jaws, both removable from the guides, and means on one of the jaws for holding the guides upon the rule.

7. In a rule caliper, a pair of guides adapted to engage the edges of the rule, a connection between the guides at one end normally holding them out of parallel position and means removable longitudinally with respect to the guides for clamping them against the edge of the rule to retain them there and hold them in parallel position.

8. In a rule caliper, a pair of guides adapted to engage the edges of the rule, a connection between the guides at one end normally holding them out of parallel position and a pair of calipering jaws, engaging the guides and one of which is adapted to press the guides into parallelism and against the edges of the rule.

9. In a rule caliper, a pair of guides, a caliper jaw, means upon the jaw for holding the guides against the rule, a second caliper jaw and means including a contact shoe for engaging the guides to retain said jaw in adjusted position.

10. A sheet metal jaw for beam calipers the sheet from which the jaw is made being bent upon itself to form the spaced parallel sides of the jaw which are thus connected at one end, one of the sides having an extension forming a measuring arm, a block interposed between and secured to the free ends of the sides and retaining screws passing through the block parallel to the sides.

KNUT ELVING SOLBERG.